United States Patent
Loughman

(10) Patent No.: US 6,598,839 B2
(45) Date of Patent: Jul. 29, 2003

(54) ENTERTAINMENT STAND

(76) Inventor: Van J. Loughman, 1252 Browns Creek Rd., Sycamore, PA (US) 15364

( * ) Notice: Subject to any disclaimer, the term of this patent is extended or adjusted under 35 U.S.C. 154(b) by 0 days.

(21) Appl. No.: 10/039,967

(22) Filed: Nov. 9, 2001

(65) Prior Publication Data

US 2003/0089830 A1 May 15, 2003

(51) Int. Cl.$^7$ ................................................ A47F 5/00
(52) U.S. Cl. .............................. 248/125.7; 248/441.1; 40/611; 40/658
(58) Field of Search ..................... 248/125.7, 444.1, 248/441.1, 445; 211/205, 204, 171; 40/611, 658

(56) References Cited

U.S. PATENT DOCUMENTS

| | | | | | |
|---|---|---|---|---|---|
| 1,083,764 | A | * | 1/1914 | Smith | 248/445 |
| 1,559,366 | A | * | 10/1925 | Phelps, Jr. | 248/458 |
| 1,916,667 | A | * | 7/1933 | Hoogendyk | 248/445 |
| 2,104,072 | A | * | 1/1938 | Carr | 248/458 |
| 2,193,907 | A | * | 3/1940 | Love | 248/445 |
| 2,546,283 | A | * | 3/1951 | Webster | 108/8 |
| 3,790,770 | A | * | 2/1974 | Stern | 362/98 |
| 3,905,573 | A | * | 9/1975 | Davis | 248/445 |
| 3,934,806 | A | * | 1/1976 | Rady | 248/441.1 |
| 4,119,289 | A | | 10/1978 | Kanocz | 248/454 |
| 4,596,372 | A | * | 6/1986 | Ford | 248/444.1 |
| 4,790,506 | A | | 12/1988 | Malinowski et al. | 248/441.1 |
| 5,058,848 | A | * | 10/1991 | Ferraro | 248/444.1 |
| 5,199,680 | A | * | 4/1993 | Rivera | 248/441.1 |
| 5,351,927 | A | | 10/1994 | Howell | 248/444.1 |
| 5,359,741 | A | | 11/1994 | Lang | 5/507.1 |
| 5,377,946 | A | | 1/1995 | Pannu | 248/456 |
| D362,130 | S | * | 9/1995 | Alba | D6/399 |
| 5,465,744 | A | | 11/1995 | Browning | 135/67 |
| 5,485,980 | A | | 1/1996 | Luccia | 248/445 |
| 5,489,079 | A | * | 2/1996 | Goldber | 248/444.1 |
| D368,602 | S | * | 4/1996 | Jordan | D6/397 |
| 5,971,343 | A | * | 10/1999 | Marlak | 248/441.1 |
| 5,979,857 | A | | 11/1999 | Holm | 248/451 |

* cited by examiner

Primary Examiner—Kimberly Wood
Assistant Examiner—Kofi Schulterbrandt
(74) Attorney, Agent, or Firm—Webb Ziesenheim Logsdon Orkin & Hanson, P.C.

(57) ABSTRACT

An entertainment stand includes a combination hands-free book holder and tray apparatus attached to an adjustable frame The apparatus includes a transparent plate having a first surface and a second surface and a hands-free book holder in cooperation with the plate adapted for supporting reading material against the second surface of the plate, thereby permitting hands-free reading of the reading material through the plate. The apparatus is also readily convertible into a tray even while reading material is being supported between the hands-free book holder and the second surface of the plate.

11 Claims, 4 Drawing Sheets

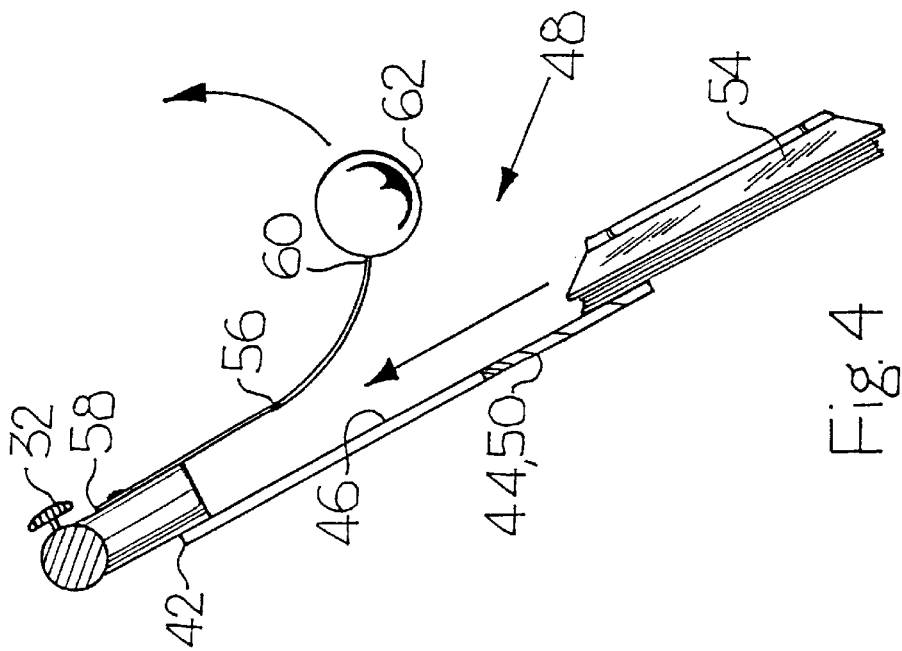
Fig. 4
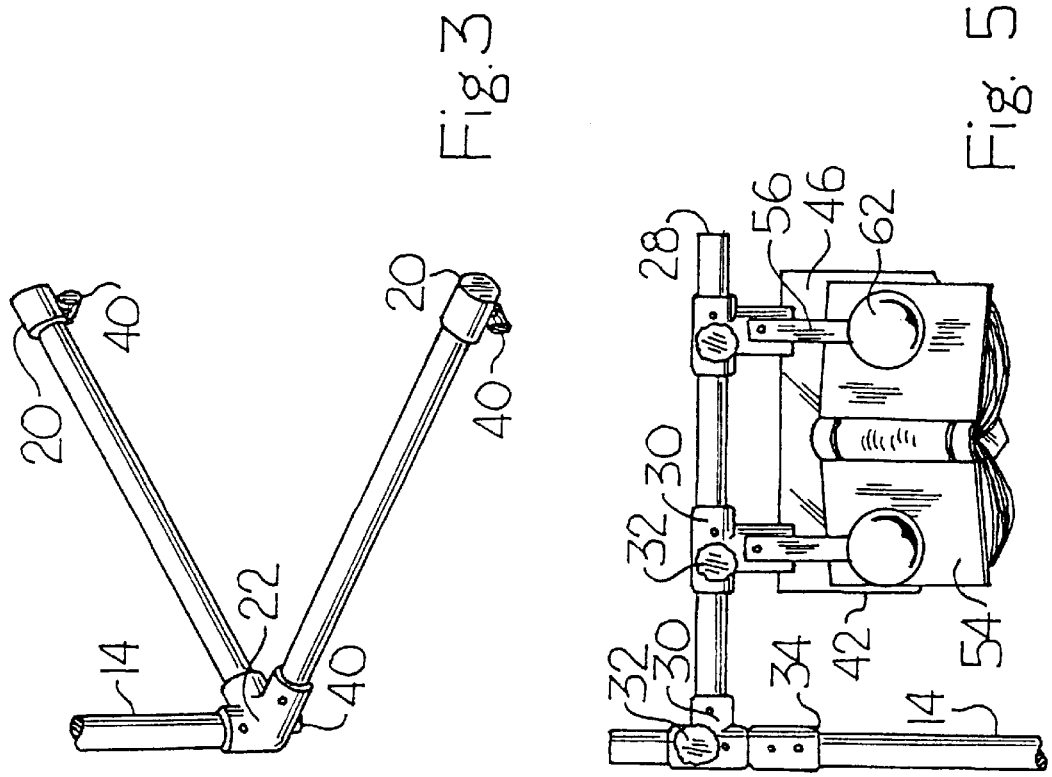
Fig. 3
Fig. 5

ENTERTAINMENT STAND

BACKGROUND OF THE INVENTION

1. Field of the Invention

The present invention is related to stands for holding books, reading material, television remote controls, and other personal items and, more particularly, the invention is related to such stands which permit hands-free reading.

2. Description of the Prior Art

Book holders to facilitate reading have been suggested and exist in the prior art. Typically, the prior art addresses the problem of reading in a sitting or reclining position where no reasonable flat surface exists for resting reading material such as a book, magazine or newspaper. Most of the prior art book holders include either a flat surface upon which to rest the reading material, a stand which adjusts the height of the reading material relative to the reader's eyesight, or possibly a book holder that allows hands-free reading of the reading material.

Trays of various types, such as bed trays are utilized in the prior art for convenience of individuals by supporting the tray on a stand to accommodate various positions of a person that is either sitting or lying on a bed. Typically, these trays hold various household items thereon, such as food, entertainment devices, tissues, beverages and the like.

One of the problems associated with the prior art hands-free book holder stands is that they are difficult to use or to convert into a tray stand for supporting the various household items. Usually, reading material has to be removed from the prior art hands-free book holder stand before the stand can be utilized as a tray stand. Moreover, a typical tray stand does not permit hands-free reading in a variety of different reclining or sitting positions. It is, therefore, an object of the present invention to overcome the deficiencies mentioned above by providing an entertainment stand that includes a combination hands-free book holder and tray apparatus capable of permitting hands-free reading in a variety of different positions when used as a hands-free book holder and which can be readily converted into a tray to accommodate various household items without removing the reading material from the hands-free book holder.

SUMMARY OF THE INVENTION

The present invention is an entertainment stand that includes a combination hands-free book holder and tray apparatus attached to an adjustable frame. The adjustable frame includes an upright post having a first end and a second end. A plurality of legs is attached to the first end of the post and a swing arm is rotatably connected to the second end of the post and extends perpendicular therefrom. The legs of the frame can be provided with wheels for easy movement of the stand on a floor. Alternatively, the legs can be inserted between a mattress and a box spring on a bed for supporting the stand.

The combination hands-free book holder and tray apparatus is rotatably connected to the swing arm of the frame. The apparatus includes a transparent plate having a first surface and a second surface and a hands-free book holder in cooperation with the plate adapted for supporting reading material against the second surface of the plate thereby permitting hands-free reading. The reading material can be read through the transparent plate.

The hands-free book holder includes at least one resilient holding arm extending from the swing arm, preferably, two holding arms extending from the swing arm. The holding arms have a first end that is resiliently connected to the swing arm and a second end that is adjacent the second surface of the plate, wherein the second end of the holding arm is adapted to press the reading material against the second surface of the transparent plate thereby supporting the reading material. The second end of the holding arm on the hands-free book holder can also include a cushion tip. The cushion tip prevents damage to the reading material when the holding arm presses the reading material against the second surface of the transparent plate. The apparatus which includes the hands-free book holder is easily rotated about a horizontal axis on the swing arm, thereby adjusting the angle of inclination to suit a reader's various body positions. The height of the hands-free book holder can also be adjusted to suit a reader by vertically adjusting the height of the swing arm along the upright post.

The combination hands-free book holder and tray apparatus is also readily convertible into a tray even while reading material is being supported between the hands-free book holder and the second surface of the plate. The apparatus is rotated until the plate is in a horizontal position wherein the first surface of the plate can be used as a tray to hold various household items. A notch can be used to fix the horizontal position of the plate.

A further object of the present invention includes a loose device tray with an attached beverage holder that is rotatably connected to the upright post. The loose device tray holds items such as a cell phone, television and VCR remote controls, tissue box, purse or wallet. The attached beverage holder holds items such as a cup, mug, beverage can or glass. The loose device tray and attached beverage holder can both rotate 360 degrees about the post and adjust vertically along the post.

BRIEF DESCRIPTION OF THE DRAWINGS

FIG. 3 is a perspective view of a portion of the frame of FIG. 1 provided with wheels;

FIG. 4 is a side elevational view of a book being inserted into a hands-free book holder of the entertainment stand of FIG. 1;

FIG. 5 is a front view of a top portion of the entertainment stand of FIG. 1 showing a book inserted into a hands-free book holder;

DETAILED DESCRIPTION OF THE PREFERRED EMBODIMENTS

Figure 1:
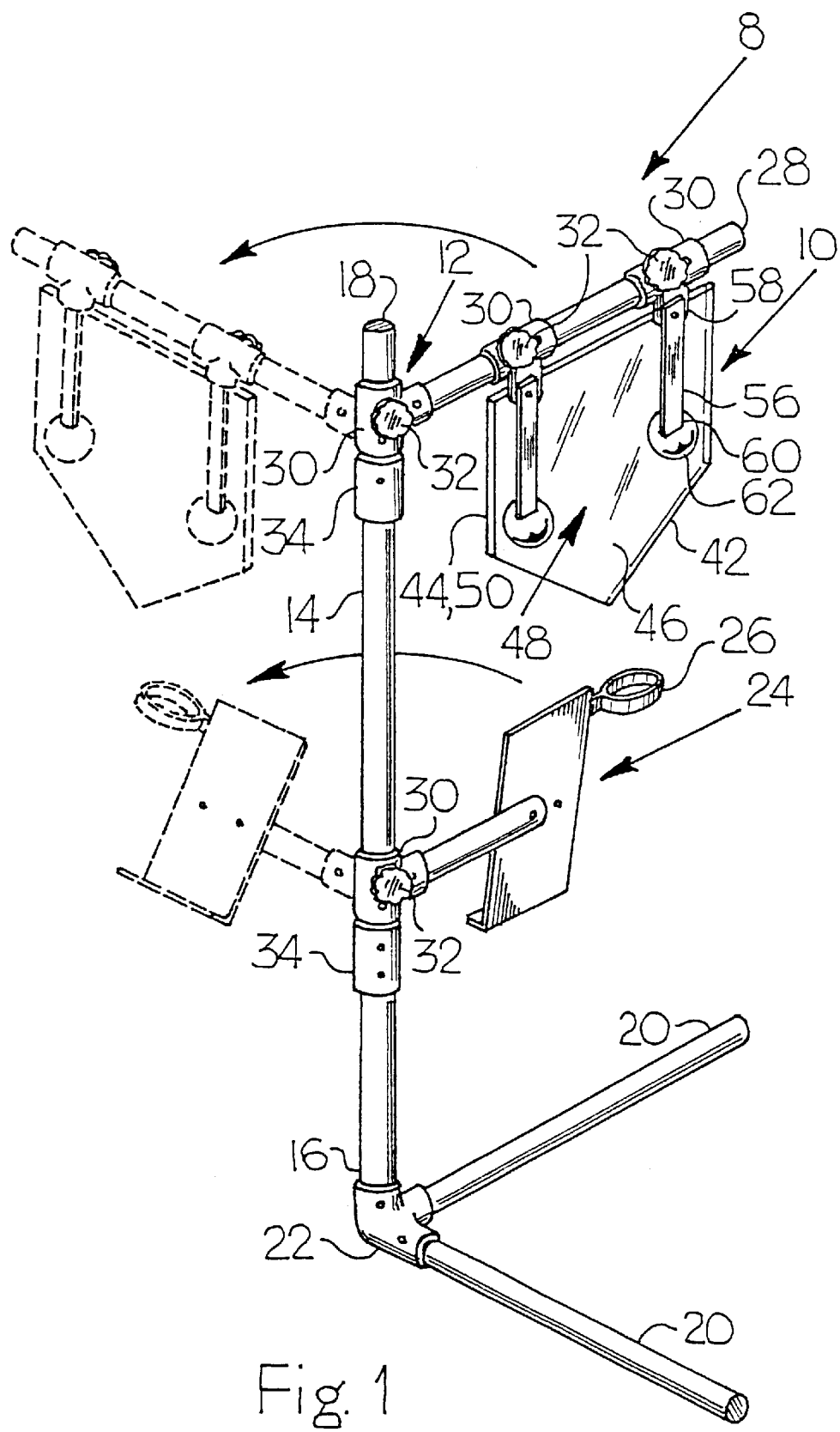
FIG. 1 is a perspective view of an entertainment stand that includes a frame and a combination hands-free book holder and tray apparatus made in accordance with the present invention.
Figure 2:
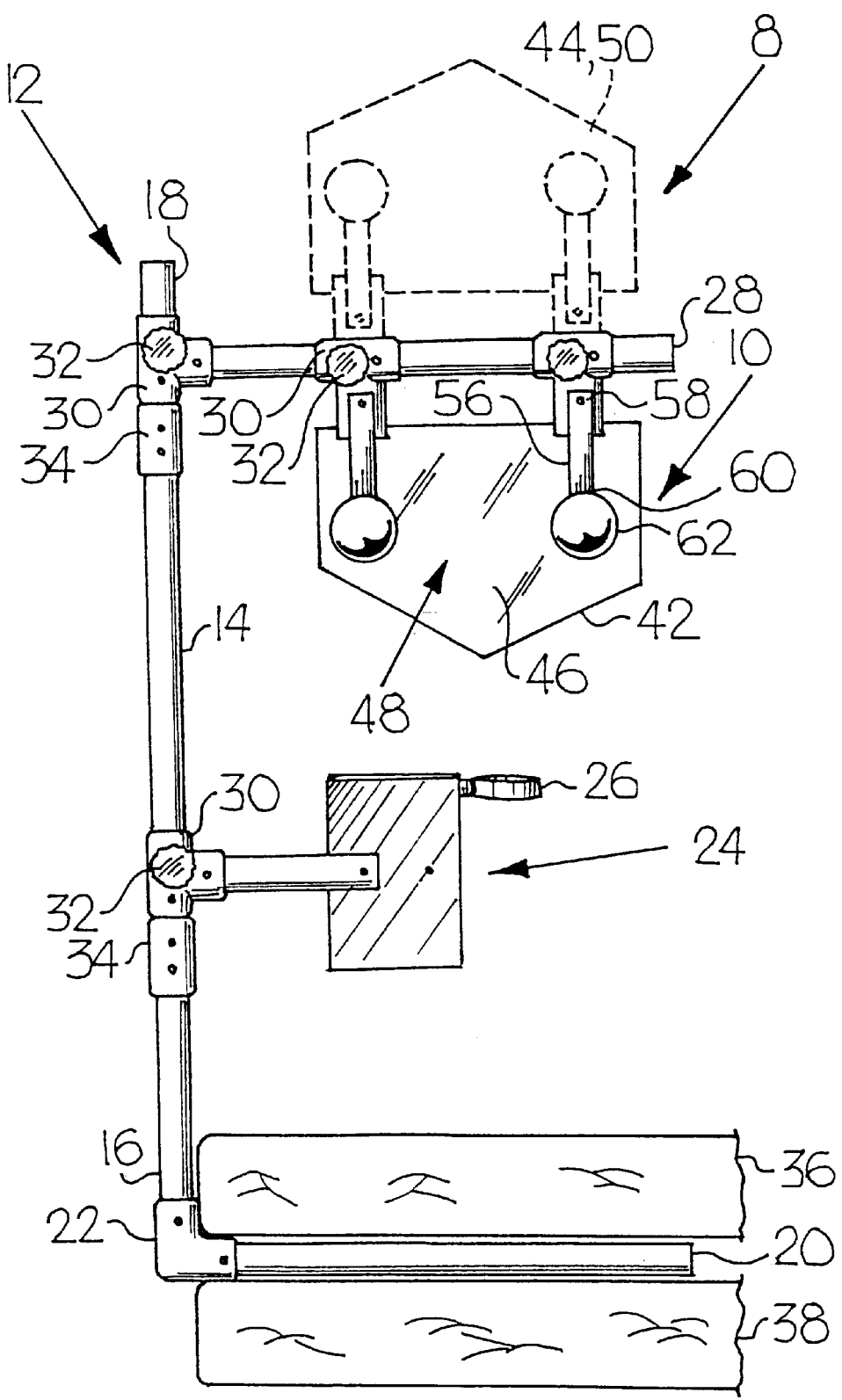
FIG. 2 is a front view of the entertainment stand of FIG. 1 showing the frame supported between a mattress and box spring of a bed.

Referring to FIGS. 1 and 2, the entertainment stand 8 made in accordance with the present invention, includes a combination hands-free book holder and tray apparatus 10 attached to an adjustable frame 12. The adjustable frame 12 includes an upright post 14 having a first end 16 and a second end 18. A plurality of legs 20 for supporting the stand 8 is attached to the first end 16 of the post 14 via a screw coupling 22. A loose device tray 24 having an attached beverage holder 26 is rotatably connected between the first end 16 and the second end 18 of the post 14. A swing arm 28 is rotatably connected to the second end 18 of the post 14 and extends perpendicular therefrom. The combination hands-free book holder and tray apparatus 10 is rotatably connected to the swing arm 28. A plurality of adjustable collars 30 having knobs 32 is used to rotatably connect both the swing arm 28 and the loose device tray 24 to the post 14, and they connect the apparatus 10 to the swing arm 28. Upon loosening the knob 32, the swing arm 28 and loose tray device 24 can be rotated 360 degrees along a vertical axis (shown in phantom in FIG. 1) and the height of the swing arm 28 can also be vertically adjusted along the post 14. A plurality of locking collars 34 attached to the post 14 is used for fixing the height of the swing arm 28 and loose device tray 24 along the post 14. The apparatus 10 can rotate 360 degrees about the swing arm 28 (shown in phantom in FIG. 2) and adjust horizontally along the swing arm 28.

FIG. 2 shows the stand 8 with the legs 20 of the frame 12 supported between a mattress 36 and box spring 38 of a bed. FIG. 3 shows a plurality of wheels 40 attached to the legs 20 of the frame 12 for easy support and movement on a floor.

With continued reference to FIGS. 1 and 2, the apparatus 10 includes a triangular-shaped transparent plate 42 having a first surface 44 and a second surface 46 and a hands-free book holder 48. The first surface 44 of the plate 42 is adapted for use as a tray 50. The hands-free book holder 48 in cooperation with the plate 42 is adapted to support reading material 54 (shown in FIG. 5) against the second surface 46 of the plate 42 thus permitting hands-free reading. Reading material 54 can include items such as books, magazines, pamphlets, newspapers, and single or multiple sheets of paper.

The hands-free book holder 48 includes a pair of resilient holding arms 56 having a first end 58 and a second end 60 extending from the swing arm 28. The first end 58 of the holding arms 56 is resiliently connected to the swing arm 28 and the second end 60 is adjacent the second surface 46 of the plate 42. The holding arms 56 are adapted to press the reading material 54 against the second surface 46 of the plate 42. A ball-shaped cushion tip 62 such as a foam ball is attached to the second end 60 of the holding arm 56. The cushion tip 62 is preferably contacting the second surface 46 of the plate 42.

FIG. 4 shows the reading material 54 being inserted into the hands-free book holder 48. A pulling force is exerted on the second end 60 of the holding arm 56 in a direction opposite the plate 42 and the reading material 54 is placed against the second surface 46 of the plate 42. The force on the holding arm 56 is then released thereby allowing cushions 62 to press the reading material 54 firmly against the second surface 46 of the plate 42. FIG. 5 shows the reading material 54 supported by the hands-free book holder 48, with text facing the second surface 46 of the plate 42. The cushion tip 62 prevents the reading material 54 from becoming damaged.

Figure 6:
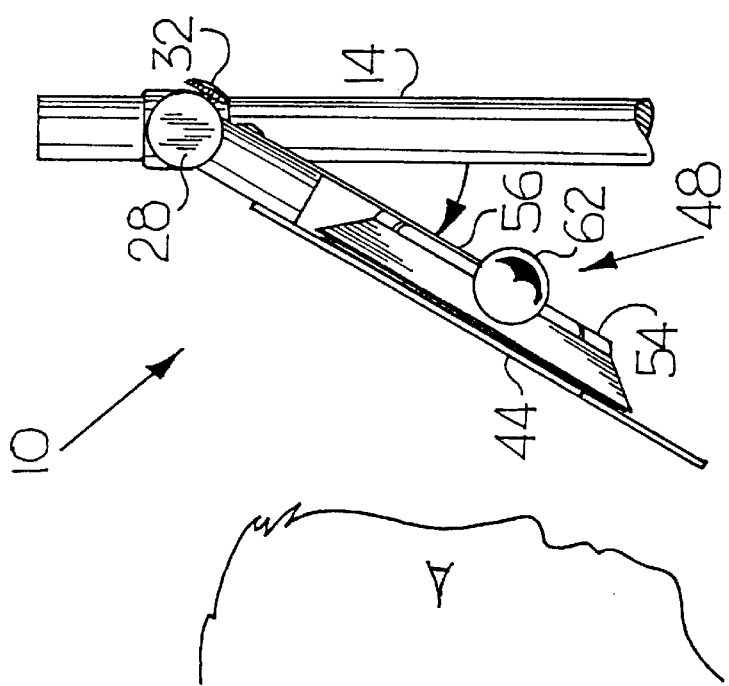
FIG. 6 is a side elevational view of the apparatus of FIG. 1 showing the relationship of the hands-free book holder to a reader's viewing position.

FIG. 6 shows a reader's viewing position relative to a position of the reading material 54 in the hands-free book holder 48. The reader can read in any desired viewing position by rotating the combination hands-free book holder and tray apparatus 10 about the swing arm 28 and/or by vertically adjusting the height of the swing arm 28 via the collar 30 and knob 32 on the post 14.

Figure 7:
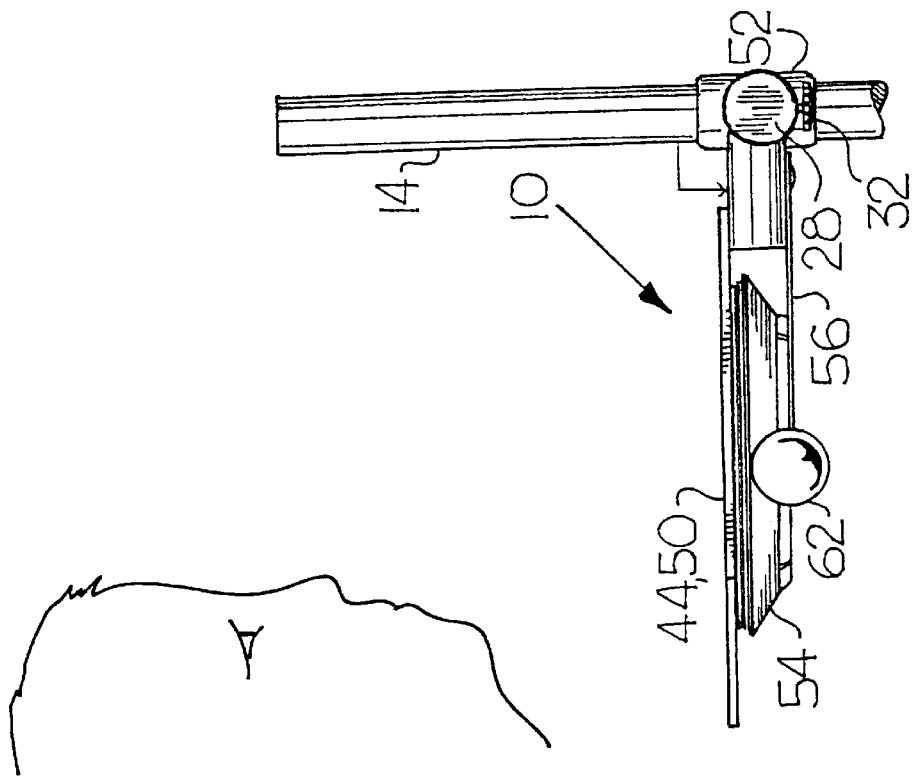
FIG. 7 is a side elevational view of the entertainment stand of FIG. 1 showing the relationship of a tray to a reader's position.

FIG. 7 shows a position of a reader using the stand 8 as a tray 50 while the reading material 54 remains supported between the hands-free book holder 48 and the second surface 46 of the plate 42. The first surface 44 of the plate 42 is used as the tray 50 when positioned horizontally via the collar 30 and knob 32. A notch 52 (not shown) can be used to fix the horizontal position of the tray 50. Depending on the position of the reader, the tray 50 can be used as a bed tray or chair tray. When the tray 50 is no longer being used, the reader can return to reading the reading material 54 by rotating the apparatus 10 back into a desired position for hands-free reading as shown in FIG. 6.

When using the stand 8 for reading, a reader inserts reading material 54 such as a book into the hands-free book holder 48 while either lying on a bed or reclining in a chair. The reader then adjusts the hands-free book holder 48 to a desired position where the reading material 54 is read through the plate 42. In order for the reader to turn a page of the book, the reader pulls the second end 60 of the holding arms 56 in a direction opposite the plate 42 and retrieves the book. The page is turned and the reader re-inserts the book back into the hands-free book holder 48. For people who read extremely fast, the apparatus 10 can be positioned downward and angled between 30 and 60 degrees (as shown in FIG. 6) so that a book can be removed easily, the page turned, and then re-inserted into the hands-free book holder 48 to continue reading. The reader can decide to convert the hands-free book holder 48 into a tray 50 by rotating the apparatus 10 until the first surface 44 of the plate 42 is in a horizontal position for use as a tray 50. The notch 52 (not shown) in cooperation with the collar 30 and knob 32 is used to fix the horizontal position of the tray 50. The tray 50 can be used as an eating surface, a reading surface or as a surface to hold small household items. The loose device tray 24 (shown in FIGS. 1 and 2) can also hold items such as tissue boxes, television and VCR remote controls, and other small household items. The beverage holder 26 can hold items such a cup, mug, beverage can or glass.

When the stand 8 is not in use, the swing arm 28 can be rotated until the apparatus 10 is no longer in front of the reader thereby making it easier for the reader to get up from a sitting or reclining position. In addition, the reader may remove the stand 8 by rolling it out of the reader's way.

It will be understood by those skilled in the art that while the foregoing description sets forth in detail preferred embodiments of the present invention, modifications, additions, and changes might be made thereto without departing from the spirit and scope of the invention.

What is claimed is:

1. An entertainment stand comprising:
   an adjustable frame, wherein said frame comprises:
      an upright post having a first end and a second end;
      a plurality of legs attached to said first end of said post;
   a swing arm rotatably connected to said second end of said post and extending therefrom; and
   a combination hands-free book holder and tray apparatus connected to said swing arm, said apparatus having a transparent plate and a hands-free book holder, said transparent plate having a first surface and a second surface, said hands-free book holder in cooperation with said plate adapted for supporting reading material against said second surface of said plate, and said plate is adapted to accommodate a tray on said first surface when said apparatus is rotated about a horizontal axis,
   wherein said hands-free book holder comprises at least one resilient holding arm extending from said swing arm, said holding arm having a first end and a second end, said first end of said holding arm is connected to said swing arm, said second end of said holding arm is adjacent said second surface of said plate, and said second end of said holding arm is adapted to press reading material against said second surface of said plate.

2. The entertainment stand of claim 1, wherein said plate has a triangular-shaped portion.

3. The entertainment stand of claim 1, wherein said frame is provided with wheels.

4. The entertainment stand of claim 1 wherein said legs are insertable between a mattress and a box spring on a bed for supporting said stand.

5. The entertainment stand of claim 1, wherein said combination hands-free book holder and tray apparatus is rotatably connected to said swing arm.

6. The entertainment stand of claim 1, further comprising a cushion tip attached to said second end of said holding arm.

7. The entertainment stand of claim 1, further comprising a beverage holder rotatably connected to said frame.

8. The entertainment stand of claim 1, further comprising a loose device tray rotatably connected to said frame.

9. The entertainment stand of claim 1, wherein said swing arm is vertically adjustable and rotatable about said post.

10. The entertainment stand of claim 1, wherein said combination apparatus is horizontally adjustable and rotatable about said swing arm.

11. An entertainment stand comprising:

an adjustable stand;

a swing arm rotatably connected to said adjustable stand and extending therefrom;

a combination hands-free book holder and tray apparatus rotatably connected to said swing arm, said apparatus having a transparent plate and a hands-free bookholder, said plate having a first surface and a second surface, said hands-free book holder in cooperation with said plate adapted for supporting reading material against said second surface of said plate, thereby permitting hands-free reading of reading material through said plate, and said apparatus readily convertible into a tray when rotated about a horizontal axis, wherein said first surface of said plate defines said tray, wherein said hands-free book holder comprises at least one resilient holding arm extending from said swing arm, said holding arm having a first end and a second end, said first end of said holding arm is connected to said swing arm, said second end of said holding arm is adjacent said second surface of said plate, and said second end of said holding arm is adapted to press reading material against said second surface of said plate.

\* \* \* \* \*